United States Patent
Lin

(10) Patent No.: US 10,187,419 B2
(45) Date of Patent: Jan. 22, 2019

(54) METHOD AND SYSTEM FOR PROCESSING NOTIFICATION MESSAGES OF A WEBSITE

(71) Applicant: Tencent Technology (Shenzhen) Company Limited, Shenzhen (CN)

(72) Inventor: Baike Lin, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 238 days.

(21) Appl. No.: 15/135,420

(22) Filed: Apr. 21, 2016

(65) Prior Publication Data

US 2016/0261627 A1   Sep. 8, 2016

Related U.S. Application Data

(63) Continuation of application No. PCT/CN2014/088410, filed on Oct. 11, 2014.

(30) Foreign Application Priority Data

Oct. 21, 2013   (CN) .......................... 2013 1 0496839

(51) Int. Cl.
G06F 21/50   (2013.01)
H04L 29/06   (2006.01)
(Continued)

(52) U.S. Cl.
CPC ........ H04L 63/1441 (2013.01); G06F 3/0482 (2013.01); G06F 3/04842 (2013.01);
(Continued)

(58) Field of Classification Search
CPC .................................................... G06F 21/554
See application file for complete search history.

(56) References Cited

U.S. PATENT DOCUMENTS

| | | | |
|---|---|---|---|
| 8,042,178 B1 * | 10/2011 | Fisher | G06F 21/554 726/22 |
| 2010/0287151 A1 * | 11/2010 | Mustonen | G06F 17/30876 707/707 |
| 2013/0232074 A1 * | 9/2013 | Carlson | G06Q 20/42 705/44 |

FOREIGN PATENT DOCUMENTS

| | | |
|---|---|---|
| CN | 101359329 A | 2/2009 |
| CN | 102253943 A | 11/2011 |
| CN | 103116722 A | 5/2013 |

OTHER PUBLICATIONS

Tencent Technology, ISRWO, PCT/CN2014/088410, Jan. 5, 2015, 7 pgs.

(Continued)

*Primary Examiner* — Josnel Jeudy
(74) *Attorney, Agent, or Firm* — Morgan, Lewis & Bockius LLP

(57) ABSTRACT

A method and system for secure notification message presentation are disclosed. A device with one or more processors and memory detects a trigger to display a notification message and, in response to detecting the trigger, determines a risk level corresponding to the notification message based on content of the notification message, where the risk level is one of benign, malicious, or unknown. In accordance with a determination that the risk level corresponding to the notification message is benign, the device displays the notification message. In accordance with a determination that the risk level corresponding to the notification message is malicious, the device displays blocking display of the notification message.

17 Claims, 14 Drawing Sheets

(51) Int. Cl.
*H04W 4/18* (2009.01)
*G06F 3/0482* (2013.01)
*G06F 3/0484* (2013.01)

(52) U.S. Cl.
CPC ........... *H04L 63/1416* (2013.01); *H04W 4/18* (2013.01); *H04L 63/101* (2013.01)

(56) References Cited

OTHER PUBLICATIONS

Tencent Technology, IPRP, PCT/CN2014/088410, Apr. 26, 2016, 5 pgs.

\* cited by examiner

METHOD AND SYSTEM FOR PROCESSING NOTIFICATION MESSAGES OF A WEBSITE

PRIORITY CLAIM AND RELATED APPLICATION

This application is a continuation application of PCT Patent Application No. PCT/CN2014/088410, entitled "METHOD AND SYSTEM FOR PROCESSING NOTIFICATION MESSAGES OF A WEBSITE" filed on Oct. 11, 2014, which claims priority to Chinese Patent Application No. 201310496839.4, entitled "METHOD, APPARATUS AND SYSTEM FOR PROCESSING NOTIFICATION MESSAGE OF WEBSITE," filed on Oct. 21, 2013, both of which are incorporated by reference in their entirety.

TECHNICAL FIELD

The present disclosure relates to the field of Internet technologies and, in particular, to a method and system for secure notification message presentation.

BACKGROUND

Typically, a notification message is displayed in the form of a pop-up message in a web browser. The popup message allows a web server to push a preset message to the web browser in a timely manner. For example, the web server pushes a message box with text and pictures (e.g., a pop-up message box) to a terminal installed with a web browser in a point-to-point manner, and the message box shows notification messages such as software patch information, advertisements, and the like. Such a notification message is capable of being sent to target users directly and precisely. As a low-cost and effective advertising form, pop-up messages are capable of eliciting user interaction.

However, the click rate corresponding to pop-up messages (e.g., advertisements) is low. In order to improve the click rate, some websites disguise the pop-up messages as patch information (e.g., a Microsoft Windows™ patch) or official information of well-known corporations to obtain a higher click rate. These disguised pop-up messages lead to misapplication by users. More seriously, some malicious users may include links to viruses or illegal websites into these pop-up messages. Thus, when users click the information, they may inadvertently access a virus-carrying website, which causes a user's terminal to be infected.

In order to solve the above-mentioned problems, some existing web browsers provide a function that blocks all pop-up messages; thus, the web browser no longer displays notification messages pushed by the server. The blocking function, however, is indiscriminate as some official, benign messages are also blocked. As such, some useful information is blocked by the web browser resulting in a loss of information on the terminal and inconvenience to the users.

SUMMARY

In some embodiments, a method of secure notification message presentation is performed at a device (e.g., client device 102, FIGS. 1 and 3) with one or more processors and memory. The method includes detecting a trigger to display a notification message and, in response to detecting the trigger, determining a risk level corresponding to the notification message based on content of the notification message, where the risk level is one of benign, malicious, or unknown. In accordance with a determination that the risk level corresponding to the notification message is benign, the method includes displaying the notification message. In accordance with a determination that the risk level corresponding to the notification message is malicious, the method includes blocking display of the notification message.

In some embodiments, a computing device (e.g., client device 102, FIGS. 1 and 3) or a component thereof (e.g., plug-in 106, FIGS. 1 and 3) includes one or more processors and memory storing one or more programs for execution by the one or more processors, the one or more programs include instructions for performing, or controlling performance of, the operations of any of the methods described herein. In some embodiments, a non-transitory computer readable storage medium storing one or more programs, the one or more programs comprising instructions, which, when executed by a computing device (e.g., client device 102, FIGS. 1 and 3) or a component thereof (e.g., plug-in 106, FIGS. 1 and 3) with one or more processors, cause the computing device to perform, or control performance of, the operations of any of the methods described herein. In some embodiments, a computing device (e.g., client device 102, FIGS. 1 and 3) or a component thereof (e.g., plug-in 106, FIGS. 1 and 3) includes means for performing, or controlling performance of, the operations of any of the methods described herein.

Various advantages of the present application are apparent in light of the descriptions below.

BRIEF DESCRIPTION OF DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1:
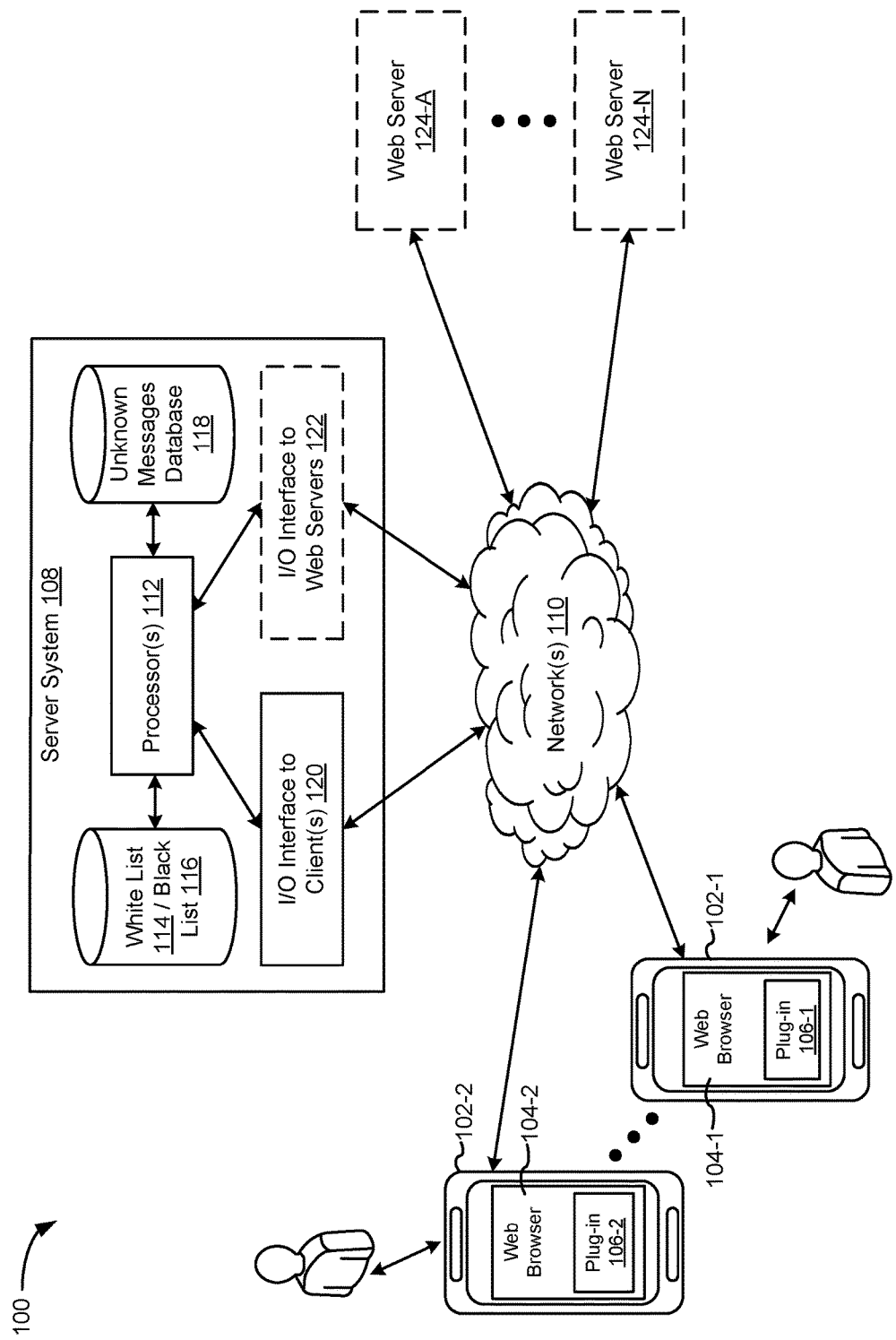
FIG. 1 is a block diagram of a server-client environment in accordance with some embodiments.

In accordance with some embodiments, server-client environment 100 includes client devices 102-1, 102-2 and server system 108. In some embodiments, a web browser 104 is executed on a client device 102, and web browser 104 includes a plug-in 106 that communicates with server system 108 through one or more networks 110. The web-browser 104 also communicates with one or more web servers 124 to obtain content of webpages and content of one or more notification messages that the web servers are configured to present in the web browser with the webpages. As shown in FIG. 1, data processing for a secure notification message presentation application is implemented in a server-client environment 100 in accordance with some embodiments. Plug-in 106 provides client-side functionalities for the secure notification message presentation application and communications with server system 108. Server system 108 provides server-side functionalities for the secure notification message presentation application for any number of plug-ins 106 each being executed from a web browser 104 on a respective client device 102.

In some embodiments, server system 108 includes one or more processors 112, white list 114, black list 116, unknown messages database 118, an I/O interface to one or more clients 120, and an optional I/O interface 122 to one or more web servers 124. I/O interface to one or more clients 120 facilitates the client-facing input and output processing for server system 108. In some embodiments, processor(s) 112 obtain a request from a client device 102 to determine the risk level for a notification message and sending a response to the client device 102 to display the notification message, block the notification message, or display a secure representation of the notification message. White list 114 includes a list of notification messages whose risk level is benign, and black list 116 includes a list of notification messages whose risk level is malicious. Unknown messages database 118 includes a list of notification messages whose risk level is unknown. In other words, the notification messages in unknown messages database 118 are neither on white list 114 nor black list 116. In some embodiments, unknown messages database 118 also includes, for each notification message in unknown messages database 118, a number of votes by other users indicating whether a respective notification message is safe or unsafe. I/O interface to one or more web servers 122 facilitates communications with one or more web servers 124 (e.g., the web servers providing the content of the webpages and/or notification messages). In some embodiments, the processor(s) 112 reach out to the web servers providing the notification message to obtain information about the source and the content of the notification message based on the request from the client device 102 before determining the risk level of the notification message.

Examples of client device 102 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108.

Figure 2:
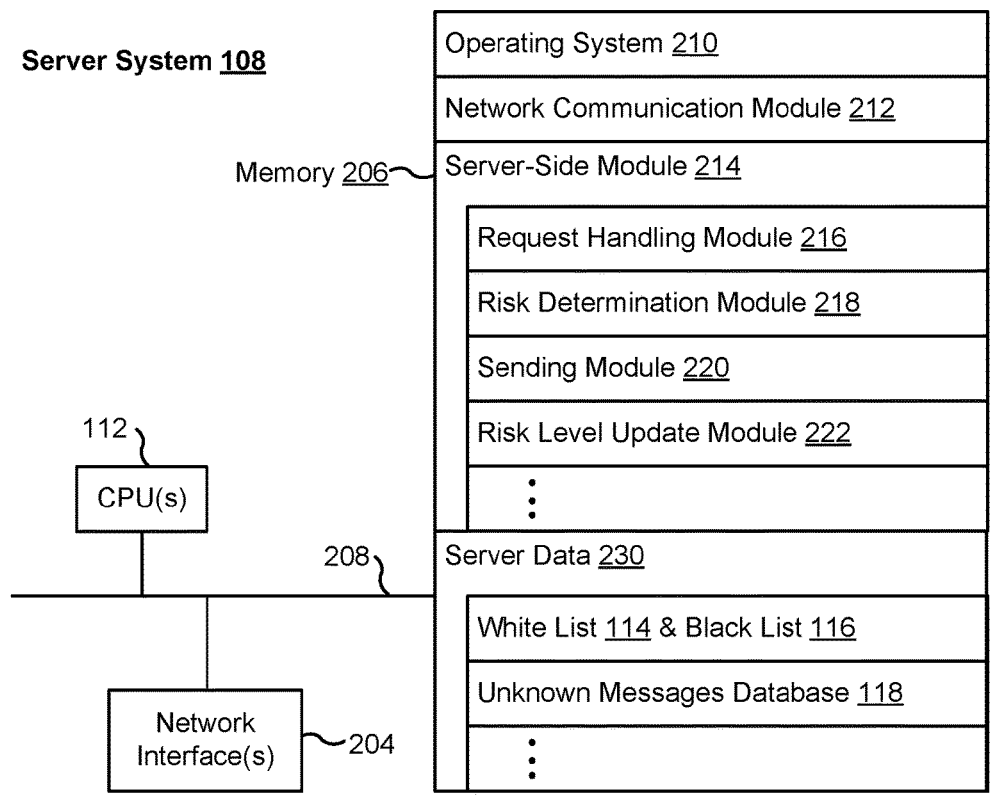
FIG. 2 is a block diagram of a server system in accordance with some embodiments.
Figure 3:
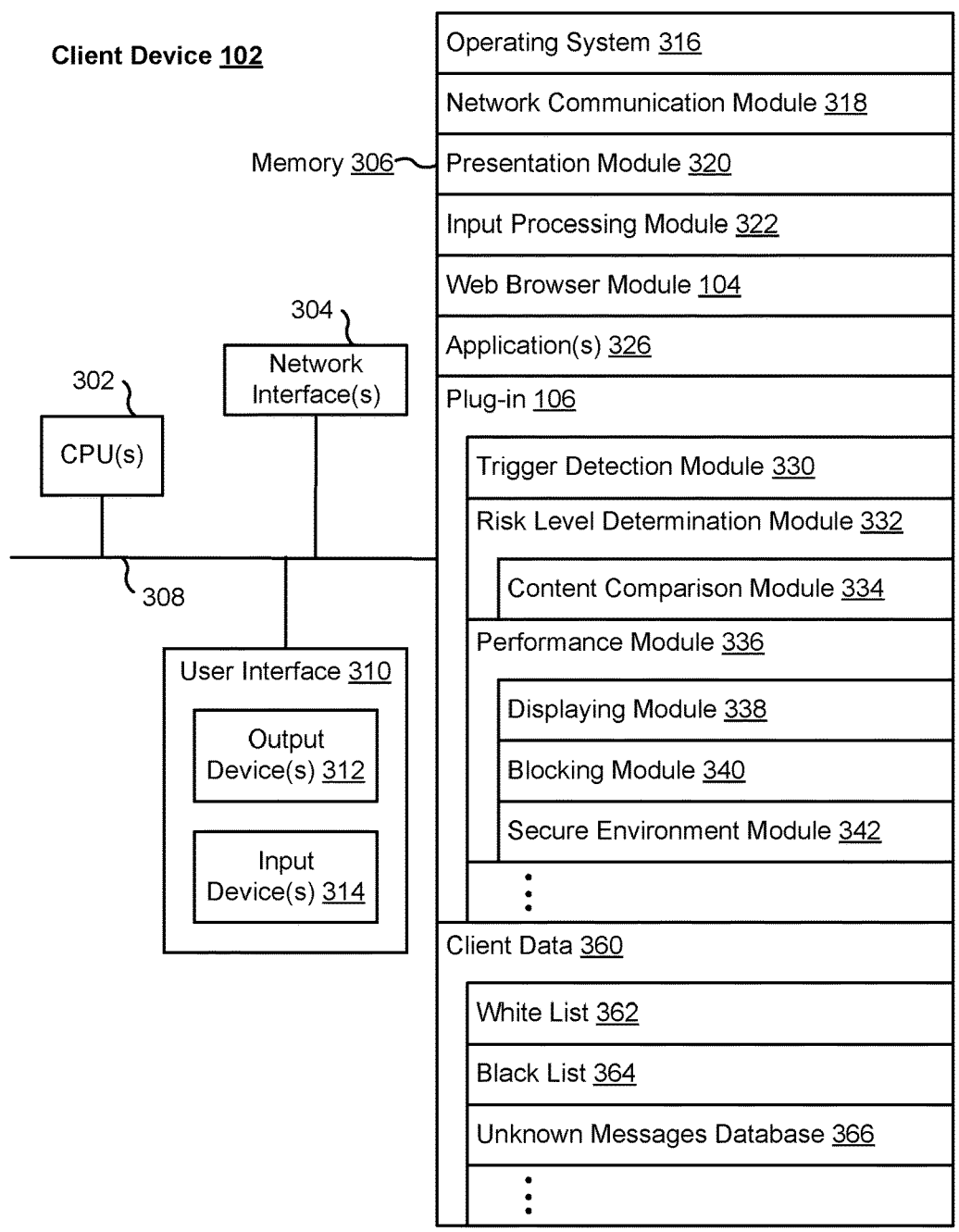
FIG. 3 is a block diagram of a client device in accordance with some embodiments.

In FIG. 1, the secure notification message presentation application includes both a client-side portion (e.g., plug-in 106) and a server-side portion (e.g., server system 108). In some embodiments, data processing is implemented as a standalone application installed on client device 102. In addition, the division of functionalities between the client and server portions of client environment data processing can vary in different embodiments. For example, in some embodiments, plug-in 106 is a thin-client that provides only user-facing input and output processing functions, and delegates all other data processing functionalities to a backend server (e.g., server system 108). For example, in some embodiments, the secure notification message presentation application is implemented entirely by plug-in 106 and client device 102 stores a white list 362, black list 364, and unknown messages database 364 (FIG. 3). In another example, in some embodiments, the secure notification message presentation application is implemented entirely by server system 108 and server system 108 stores white list 114, black list 116, and unknown messages database 118 (FIGS. 1-2). In another example, the secure notification message presentation application is implemented by plug-in 106 and server system 108 stores white list 114, black list 116, and unknown messages database 118 (FIGS. 1-2).

FIG. 2 is a block diagram illustrating server system 108 in accordance with some embodiments. Server system 108, typically, includes one or more processing units (CPUs) 112, one or more network interfaces 204 (e.g., including I/O interface to one or more clients 118 and I/O interface to one or more external services 120), memory 206, and one or more communication buses 208 for interconnecting these components (sometimes called a chipset). Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 112. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

- operating system 210 including procedures for handling various basic system services and for performing hardware dependent tasks;
- network communication module 212 for connecting server system 108 to other computing devices (e.g., client devices 102 and web server(s) 124) connected to one or more networks 110 via one or more network interfaces 204 (wired or wireless);
- server-side module 214, which provides server-side data processing and functionalities for the secure notification message presentation application, including but not limited to:
  - request handling module 216 for receiving a request from a client device 102 to determine the risk level for a notification message;
  - risk determination module 218 for determining a risk level for a notification message corresponding to the request received by request handling module 216;
  - sending module 220 for sending a response to client device 102 to display the notification message corresponding to the request, block the notification message corresponding to the request, or display a secure representation of the notification message corresponding to the request; and
  - risk level update module 222 for updating the risk level of a notification message (e.g., after the ratio of unsafe to safe votes or vice versa for a notification message in unknown messages database 118 exceeds a predetermined threshold updating the notification message to malicious or vice versa); and
- server data 230 storing data for the secure notification message presentation application, including but not limited to:
  - white list 114 including a list of notification messages whose risk level is benign;
  - black list 116 including a list of notification messages whose risk level is malicious; and
  - unknown messages database 118 including a list of notification messages whose risk level is unknown.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

FIG. 3 is a block diagram illustrating a representative client device 102 in accordance with some embodiments. Client device 102, typically, includes one or more processing units (CPUs) 302, one or more network interfaces 304, memory 306, and one or more communication buses 308 for interconnecting these components (sometimes called a chipset). Client device 102 also includes a user interface 310. User interface 310 includes one or more output devices 312 that enable presentation of media content, including one or more speakers and/or one or more visual displays. User interface 310 also includes one or more input devices 314, including user interface components that facilitate user input such as a keyboard, a mouse, a voice-command input unit or microphone, a touch screen display, a touch-sensitive input pad, a gesture capturing camera, or other input buttons or controls. Furthermore, some client devices 102 use a microphone and voice recognition or a camera and gesture recognition to supplement or replace the keyboard. Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

- operating system 316 including procedures for handling various basic system services and for performing hardware dependent tasks;
- network communication module 318 for connecting client device 102 to other computing devices (e.g., server system 108) connected to one or more networks 110 via one or more network interfaces 304 (wired or wireless);
- presentation module 320 for enabling presentation of information (e.g., a user interface for application(s) 326, widgets, websites and web pages thereof, and/or games, audio and/or video content, text, etc.) at client device 102 via one or more output devices 312 (e.g., displays, speakers, etc.) associated with user interface 310;
- input processing module 322 for detecting one or more user inputs or interactions from one of the one or more input devices 314 and interpreting the detected input or interaction;
- web browser module 104 for navigating, requesting (e.g., via HTTP), and displaying websites and web pages thereof;
- one or more applications 326 for execution by client device 102 (e.g., games, application marketplaces, payment platforms, and/or other web or non-web based applications);
- plug-in 106, which provides client-side data processing and functionalities for the secure notification message presentation application, including but not limited to:
  - trigger detection module 330 for detecting a trigger to display a notification message in web browser module 104 (e.g., code or a script for triggering display of the notification message);
  - risk level determination module 332 for determining a risk level corresponding to the notification message based on content of the notification message, including but not limited to:
    - content comparison module 334 for comparing the content of the notification message to content of at least one of a source web page for the notification message and a destination web page corresponding to a link in the content of the notification message; and performance module 336 for performing an operation with the notification message based on the risk level determined by risk level determination module 332, including but not limited to:

displaying module 338 for displaying the notification message;

blocking module 340 for blocking display of the notification message; and secure environment module 342 for displaying a secure representation of the notification message; and client data 360 storing data associated with the secure notification message presentation application, including but not limited to:

white list 362 including a list of notification messages whose risk level is benign;

black list 364 including a list of notification messages whose risk level is malicious; and unknown messages database 366 including a list of notification messages whose risk level is unknown.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some embodiments, at least some of the functions of plug-in 106 are performed by server system 108, and the corresponding sub-modules of these functions may be located within server system 108 rather than plug-in 106. For example, the functions of risk level determination module 332 are performed by server system 108. In some embodiments, at least some of the functions of server system 108 are performed by plug-in 106, and the corresponding sub-modules of these functions may be located within plug-in 106 rather than server system 108. For example, the functions of risk determination module 218 are performed by plug-in 106. Server system 108 and client device 102 shown in FIGS. 2-3, respectively, are merely illustrative, and different configurations of the modules for implementing the functions described herein are possible in various embodiments.

Attention is now directed towards embodiments of user interfaces and associated processes that may be implemented on a client device 102 with zero or more speakers, zero or more microphones, and a display. For example, the display is a touch screen (sometimes also herein called a "touch screen display") enabled to receive one or more contacts and display information (e.g., media content, websites and web pages thereof, and/or user interfaces for application(s) 326). FIGS. 4A-4F illustrate exemplary user interfaces for notification message presentation in accordance with some embodiments.

Although some of the examples that follow will be given with reference to inputs on a touch screen (where the touch sensitive surface and the display are combined), in some embodiments, the device detects inputs on a touch-sensitive surface that is separate from the display. In some embodiments, the touch sensitive surface has a primary axis that corresponds to a primary axis on the display. In accordance with these embodiments, the device detects contacts with the touch-sensitive surface at locations that correspond to respective locations on the display. In this way, user inputs detected by the device on the touch-sensitive surface are used by the device to manipulate the user interface on the display of the device when the touch-sensitive surface is separate from the display. It should be understood that similar methods are, optionally, used for other user interfaces described herein.

Additionally, while the following examples are given primarily with reference to contacts (e.g., finger inputs such as finger contacts, finger tap gestures, finger swipe gestures, etc.), it should be understood that, in some embodiments, one or more of the contacts are replaced with input from another input device (e.g., a mouse-based, stylus-based, or physical button-based input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact) or depression of a physical button. Similarly, when multiple user inputs are simultaneously detected, it should be understood that multiple computer mice are, optionally, used simultaneously, or a mouse and finger contacts are, optionally, used simultaneously.

FIGS. 4A-4F show user interface 404 displayed on client device 102 (e.g., a mobile phone); however, one skilled in the art will appreciate that the user interfaces shown in FIGS. 4A-4F may be implemented on other similar computing devices. The user interfaces in FIGS. 4A-4F are used to illustrate the processes described herein, including the process described with respect to FIGS. 5 and 6A-6C.

Figure 4A:
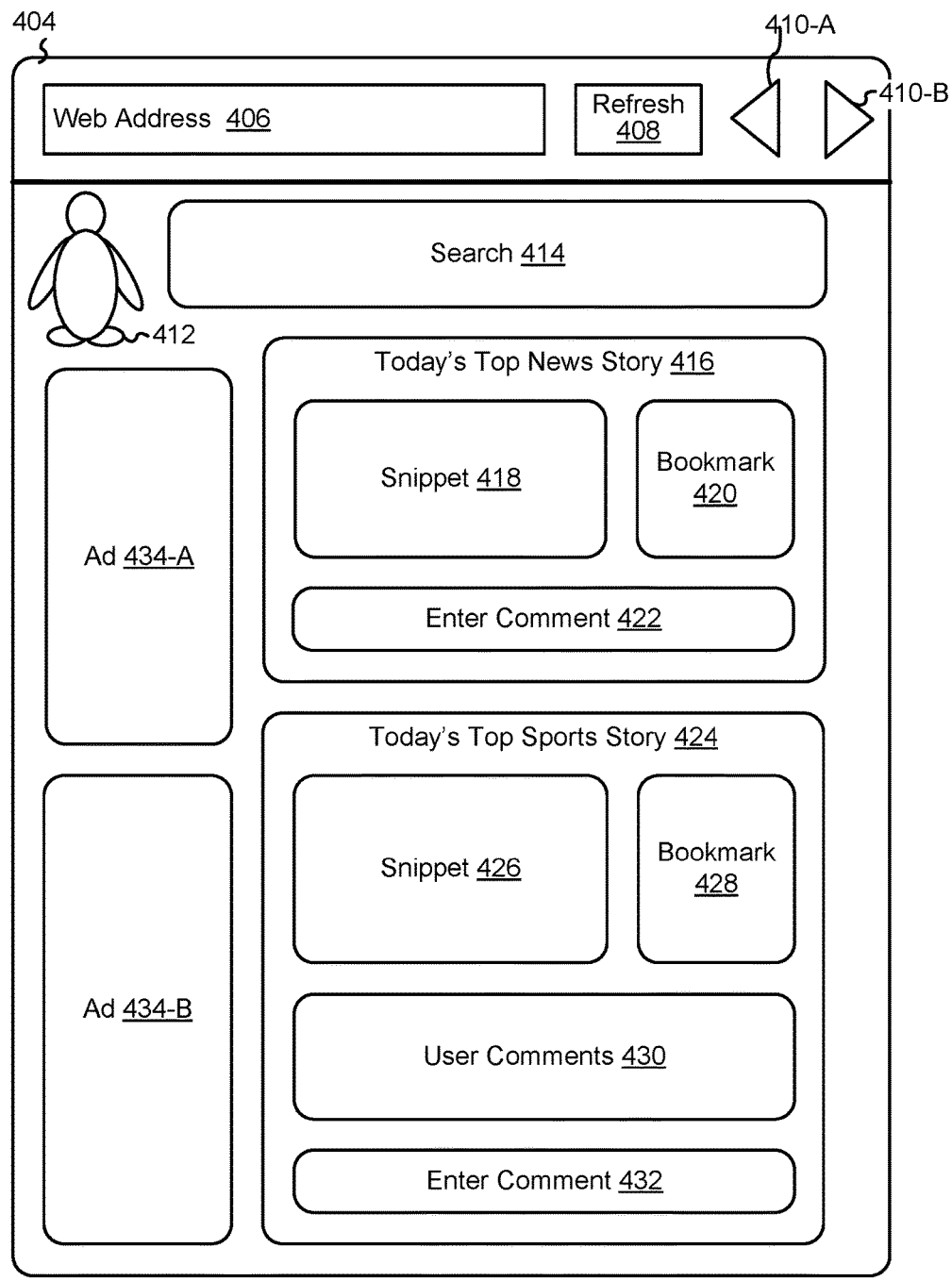
FIGS. 4A-4F illustrate exemplary user interfaces for notification message presentation in accordance with some embodiments.

FIG. 4A illustrates client device 102 executing a web browser (e.g., web browser module 104, FIGS. 1 and 3). In FIG. 4A, the web browser is displaying a landing page for a website (e.g., a news aggregation outlet). In FIG. 4A, the web browser includes a web address bar 406 showing a URL for the landing page of the website as the current web address, refresh affordance 408 for reloading the current web page, back navigation affordance 410-A for displaying the last web page, and forward navigation affordance 410-B for displaying the next web page.

In FIG. 4A, the landing page for the website includes a logo picture 412 associated with the website, a search field 414 for searching the website, and advertisements 434-A and 434-B. In FIG. 4A, the landing page for the website also includes a first content section corresponding to "Today's Top News Story" 416 with a snippet or preview 418 of the news top story, a bookmark affordance 420 for bookmarking the top news story, and a comment entry field 422 for entering a comment related to the top news story. In FIG. 4A, the landing page for the website further includes a second content section corresponding to "Today's Top Sports Story" 424 with a snippet or preview 426 of the top sports story, a bookmark affordance 428 for bookmarking the top sports story, a user comments section 430 with user comments related to the top new story, and a comment entry field 432 for entering a comment related to the top sports story.

Figure 4B:
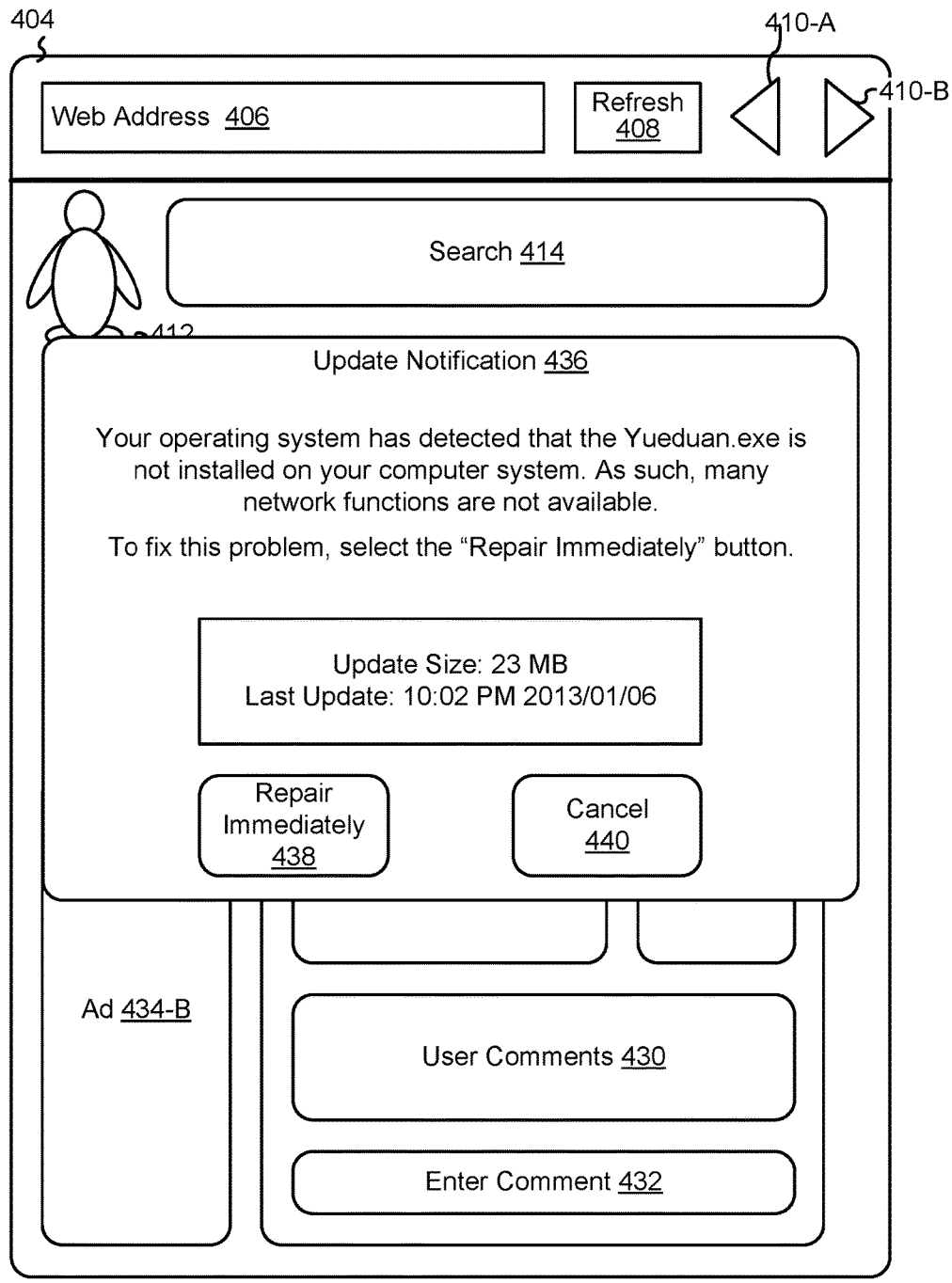

FIG. 4B illustrates the web browser displaying update notification 436 (e.g., a pop-up message) over the landing page for the website displayed in FIG. 4A (e.g., a news aggregation outlet). In FIG. 4B, update notification 436 prompts the user of client device 102 to install Yueduan.exe and also shows the update size (i.e., 23 MB) and the date of the last update (i.e., Jan. 6, 2013). In FIG. 4B, update notification 436 includes "Repair Immediately" affordance 438, which, when activated (e.g., with a tap gesture), causes the web browser to download the update and install Yueduan.exe and "Cancel" affordance 440, which, when activated (e.g., with a tap gesture), causes the web browser to cease display of update notification 436.

In some embodiments, before, after, or while rendering the landing page for the website displayed in FIG. 4A, plug-in 106 (FIGS. 1 and 3) detects a trigger to display a notification message in the web browser. For example, plug-in 106 identifies code or a script embedded in the source code of the landing page of the website for triggering download and display of update notification 436 shown in FIG. 4B. In some embodiments, after detecting the trigger and instead of automatically displaying update notification 436 as in FIG. 4B, plug-in 106 determines a risk level corresponding to update notification 436 based on the content of update notification 436. In some embodiments, after determining the risk level for update notification 436, plug-in 106 performs an operation on update notification 436 based on the determined risk level. For example, to determine the risk level corresponding to the update notification 436, the plug-in 106 obtains the content of the update notification (e.g., by extracting text, logo, and/or other characteristic information from the notification), and process the information based its match to the source address of the webpage (e.g., URL of the currently displayed landing page), to the content of the surrounding text in the webpage, and to the source address of the update notification (e.g., URL of the update notification or the web address and name of the web server supplying the update notification). Note that the source address of the notification message may be different from the source addresses of other content in the webpage. For example, much content of the webpage may be from a legitimate source, while portions of the webpage and the notification message may be from an illegitimate source. The consistency between the content of the webpage, the source addresses of the content of the webpage, the content of the notification message, and the source address of the notification message can be used to determine the risk level of the notification message. This risk determination based on the content of the notification message differ from the conventional technique of using a simple blacklist or white list to filter the source address of a webpage to decide whether to display notification messages triggered on the webpage.

In some embodiments, the determination of risk level can also include a determination based on stored black, white, and/or unknown risk level lists. The list can be based on the source address of the notification messages and/or the source addresses of the websites, or some other identifiers that identify various combinations of characteristics (e.g., source address or content) of the webpage and notification message. For example, if update notification 436 is included on a white list, plug-in 106 displays update notification 436. (See FIG. 4C and accompanying text). In another example, if update notification 436 is included on a black list, plug-in 106 blocks display of update notification 436. (See FIG. 4D and accompanying text.) In another example, if update notification 436 is neither on the white list nor the black list, plug-in 106 (a) display of update notification 436, (b) blocks display of update notification 436, or (c) displays a secure representation of update notification 436. (See FIG. 4F and accompanying text.)

Figure 4C:
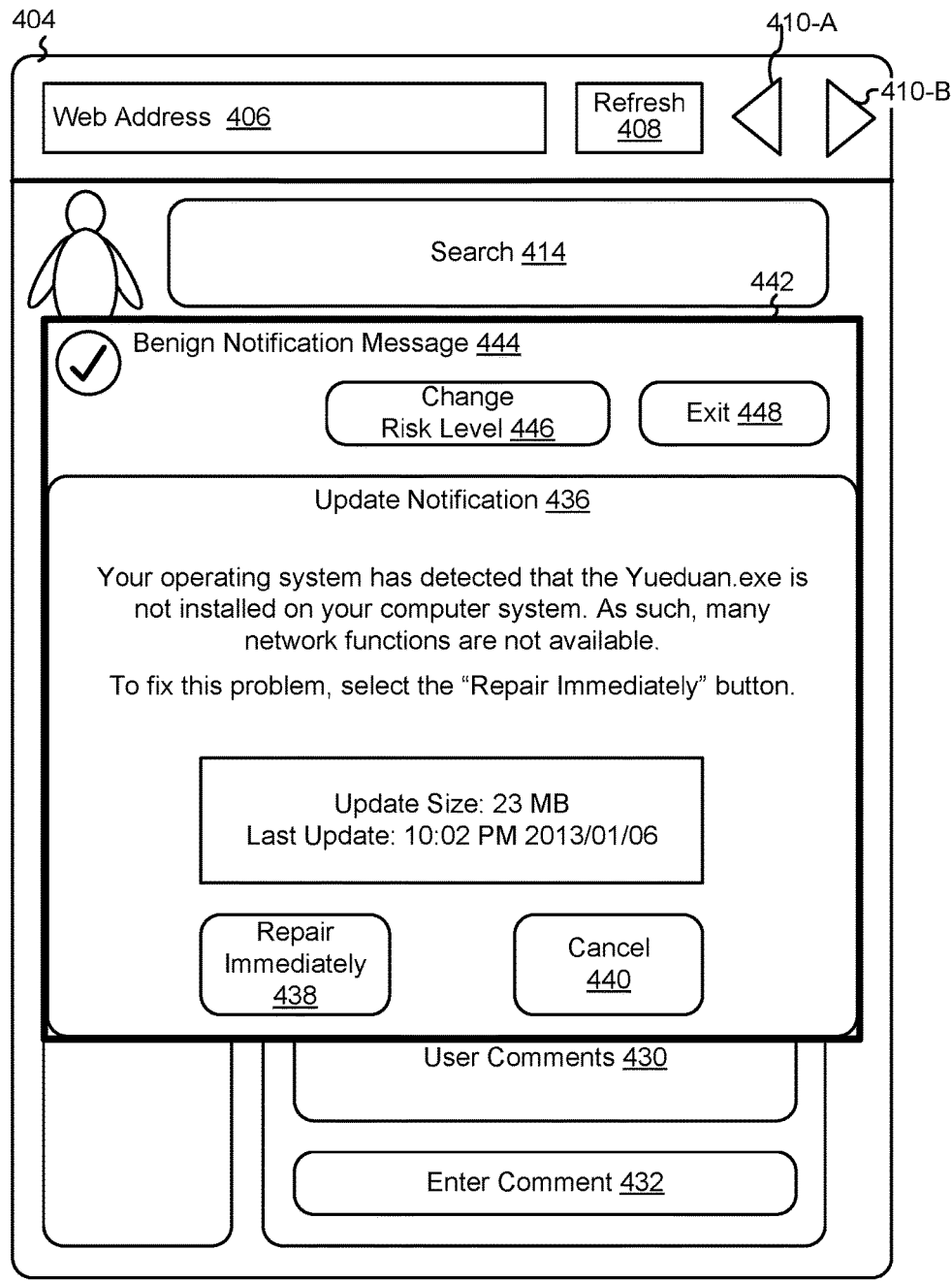

FIG. 4C illustrates the web browser displaying update notification 436 within frame 442, which is associated with plug-in 106, in accordance with a determination that update notification 436 is included on a white list. In FIG. 4C, frame 442 indicates that plug-in 106 has determined that update notification 436 is associated with a benign risk level (e.g., update notification 436 is on white list 114, FIG. 2 or white list 362, FIG. 3). In FIG. 4C, frame 442 includes "Change Risk Level" affordance 446, which, when activated (e.g., with a tap gesture), enables the user of client device 102 to change the risk level for update notification 436 from benign to unknown or malicious and "Exit" affordance 448, which, when activated (e.g., with a tap gesture), causes the web browser to cease to display frame 442 and update notification 436. In FIG. 4C, update notification 436 is live within frame 442. Thus, the user of client device 102 is able to select "Repair Immediately" affordance 438 and "Cancel" affordance 440.

Figure 4D:
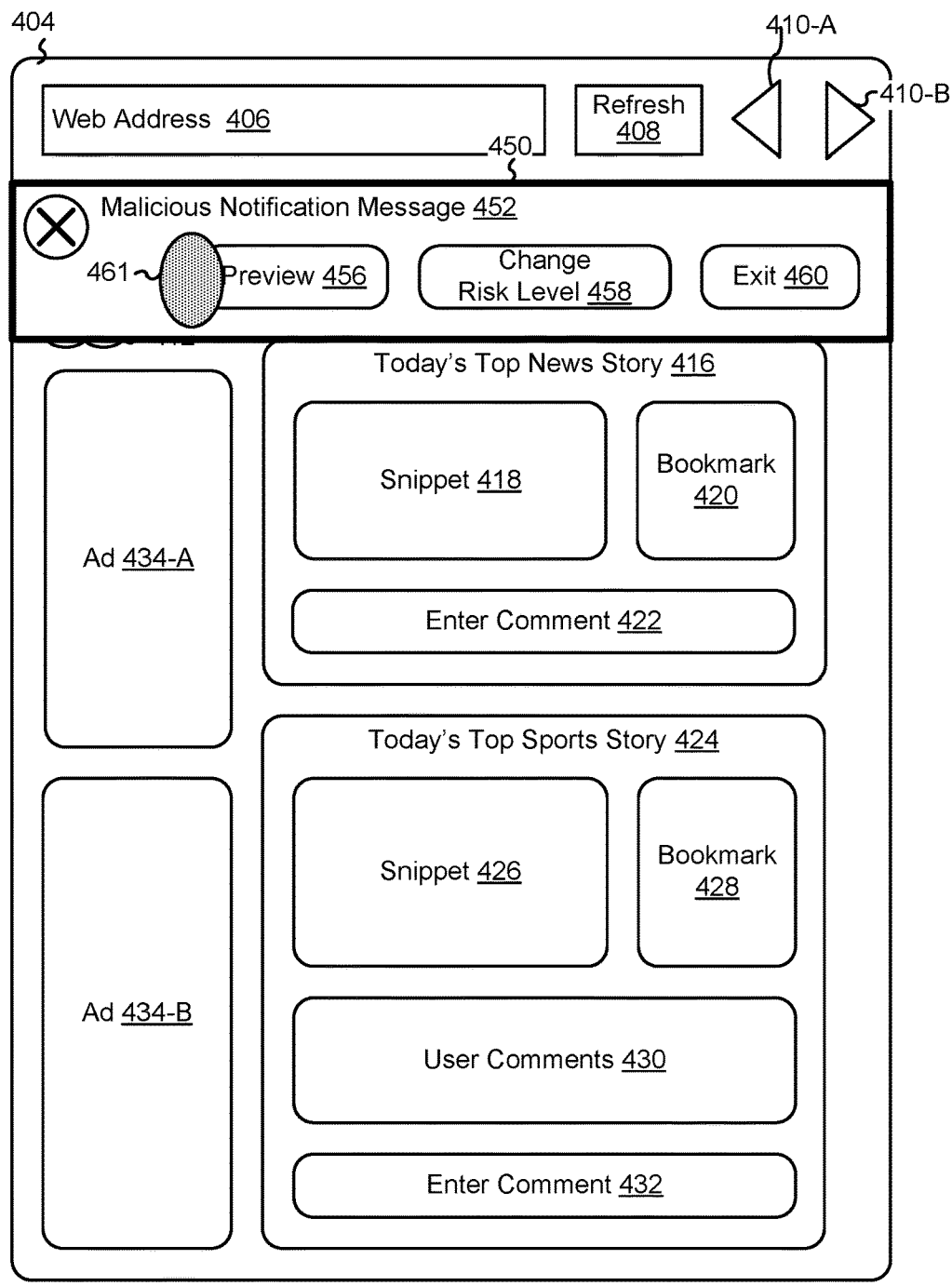

FIG. 4D illustrates the web browser displaying frame 450, which is associated with plug-in 106, in accordance with a determination that update notification 436 is included on a black list. In FIG. 4D, frame 450 is an extension of the toolbar for the web browser. In FIG. 4D, frame 450 indicates that plug-in 106 has determined that update notification 436 is associated with a malicious risk level (e.g., update notification 436 is on black list 116, FIG. 2 or black list 364, FIG. 3). In FIG. 4D, frame 450 includes "Preview" affordance 456, which, when activated (e.g., with a tap gesture), causes the web browser to display a representation of update notification 436 within frame 450. In FIG. 4D, frame 450 also includes "Change Risk Level" affordance 458, which, when activated (e.g., with a tap gesture), enables the user of client device 102 to change the risk level for update notification 436 from malicious to unknown or benign and "Exit" affordance 460, which, when activated (e.g., with a tap gesture), causes the web browser to cease to display frame 450. FIG. 4D also illustrates client device detecting contact 461 at a location corresponding to "Preview" affordance 456.

Figure 4E:
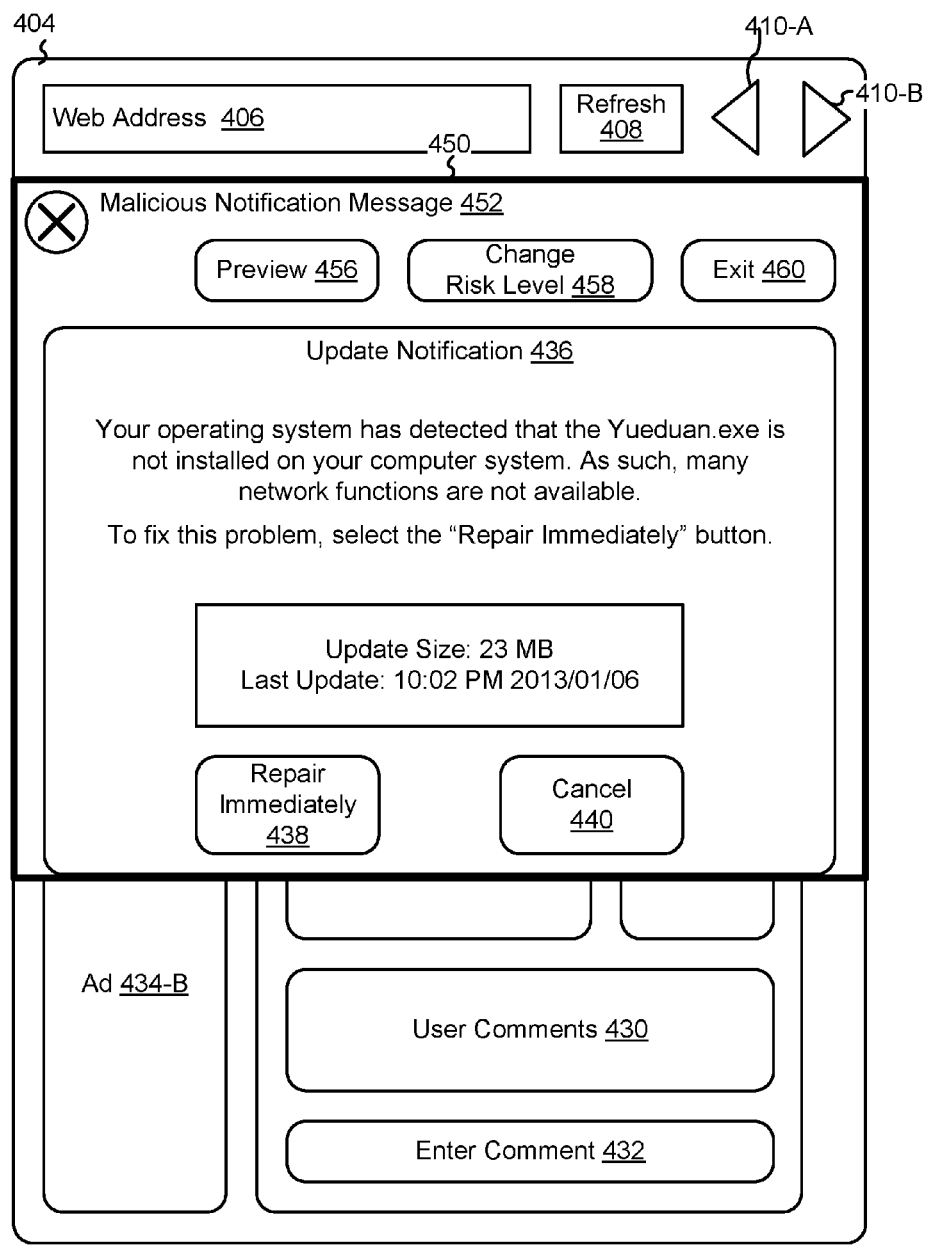

FIG. 4E illustrates the web browser displaying update notification 436 within frame 450, which is associated with plug-in 106, in response to selection of "Preview" affordance 456 in FIG. 4D. For example, in FIG. 4E, update notification 436 is a static image within frame 450. Thus, in this example, the user of client device 102 is not able to select "Repair Immediately" affordance 438 and "Cancel" affordance 440. In another example, in FIG. 4E, update notification 436 is displayed within a secure virtual machine separate from client device 102. Thus, in this example, the user of client device 102 is able to select "Repair Immediately" affordance 438 and "Cancel" affordance 440 but is not able to install Yueduan.exe on client device 102.

Figure 4F:
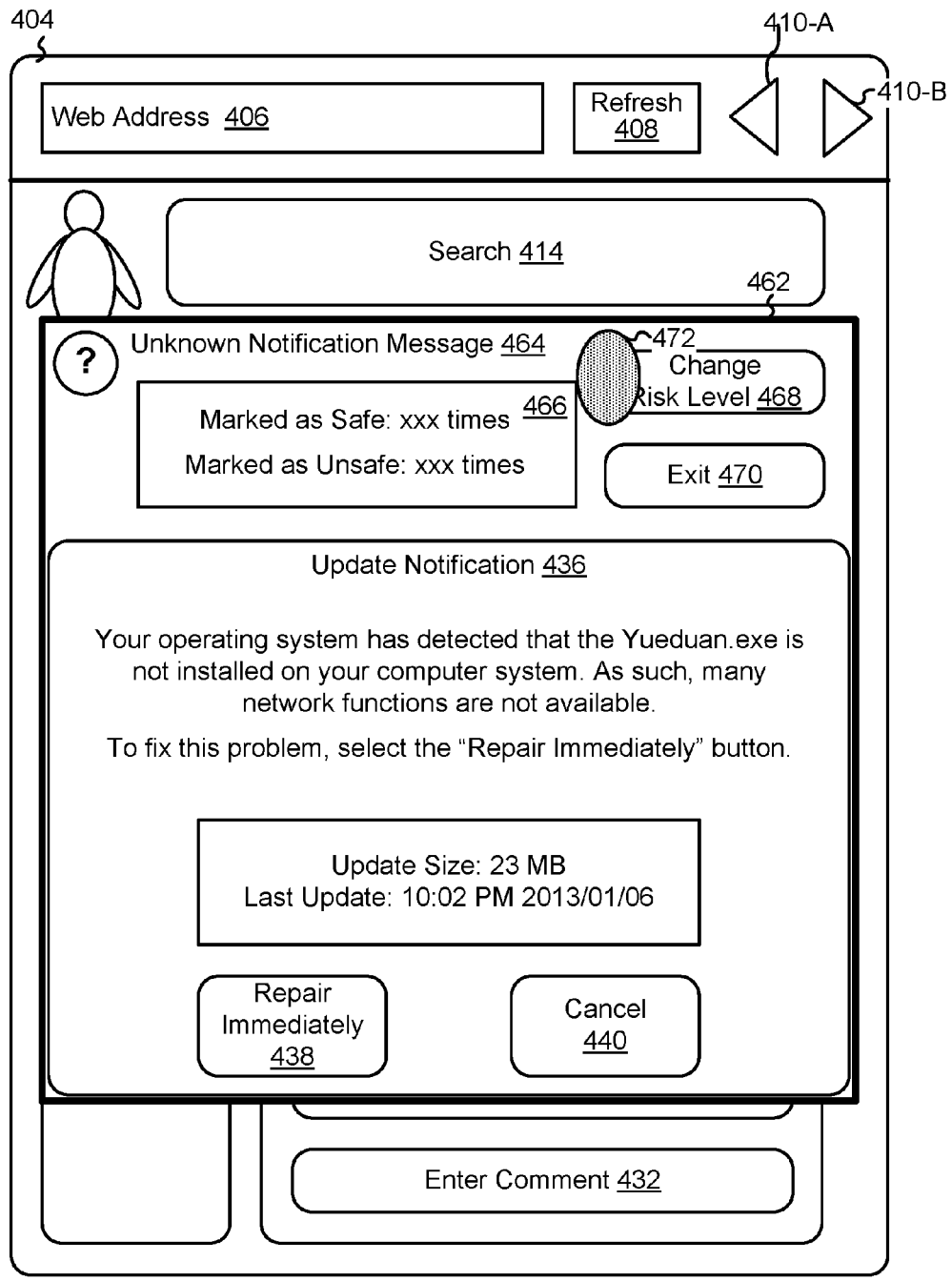

FIG. 4F illustrates the web browser displaying update notification 436 within frame 462, which is associated with plug-in 106, in accordance with a determination that update notification 436 is neither included on the white list nor the black list. In FIG. 4F, frame 462 indicates that plug-in 106 has determined that update notification 436 is associated with an unknown risk level. In FIG. 4F, frame 462 includes text box 466 indicating a count of times that users have marked update notification 436 as safe and a count of times that users have marked update notification 436 as unsafe. In FIG. 4F, frame 462 also includes "Change Risk Level" affordance 468, which, when activated (e.g., with a tap gesture), enables the user of client device 102 to change the risk level for update notification 436 from unknown to benign or malicious and "Exit" affordance 470, which, when activated (e.g., with a tap gesture), causes the web browser to cease to display frame 462 and update notification 436.

For example, in FIG. 4F, update notification 436 is live within frame 462. Thus, the user of client device 102 is able to select "Repair Immediately" affordance 438 and "Cancel" affordance 440. In another example, in FIG. 4F, update notification 436 is a static image within frame 462. Thus, in this example, the user of client device 102 is not able to select "Repair Immediately" affordance 438 and "Cancel" affordance 440. FIG. 4F also illustrates client device 102 detecting contact 472 at a location corresponding to "Change Risk Level" affordance 468. For example, in response to selection of "Change Risk Level" affordance 468, the web browser displays a series of affordances, a slider, and/or another user interface component for changing the risk level of update notification 436 from unknown to benign or malicious. In other words, the user provides an assessment of the risk level of update notification 436.

Figure 5:
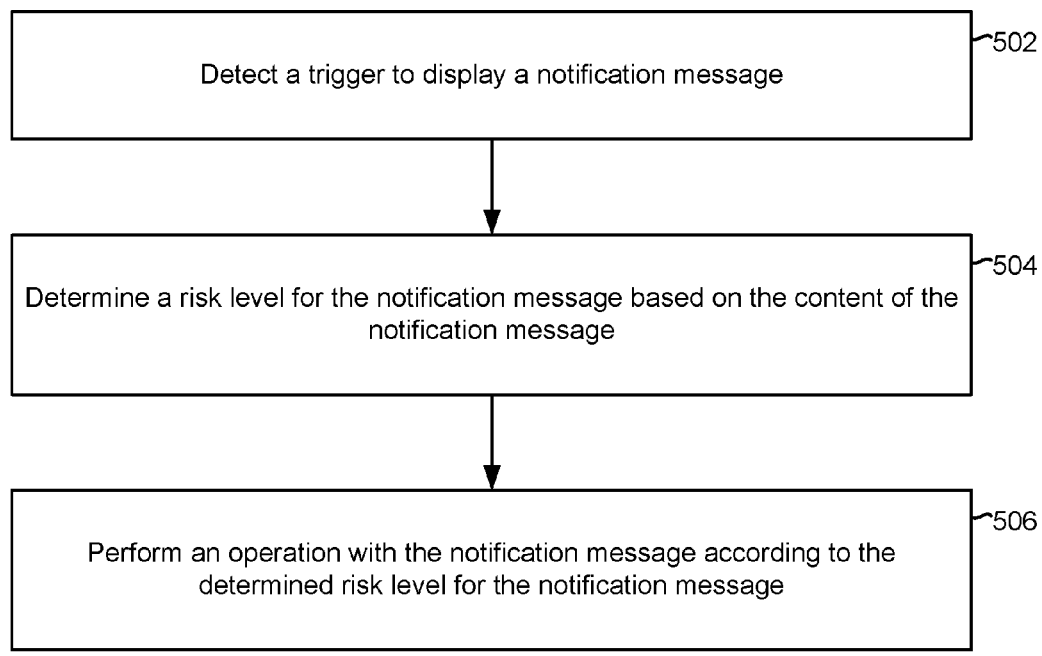
FIG. 5 is a flowchart diagram of a method of processing notification messages in accordance with some embodiments.

FIG. 5 is a flowchart diagram of a method 500 of processing notification messages in accordance with some embodiments. In some embodiments, method 500 is performed by a device with one or more processors. For example, in some embodiments, method 500 is performed by client device 102 (FIGS. 1 and 3) or a component thereof (e.g., plug-in 106, FIGS. 1 and 3). In some embodiments, method 500 is governed by instructions that are stored in a non-transitory computer readable storage medium of the device and the instructions are executed by one or more processors of the device. In some embodiments, method 500 may be applied to clients that can receive network notification messages, such as a web browser, an instant messaging client, or the like.

The device detects (502) a trigger to display a notification message. Specifically, the key character string may be used to identify corresponding notification messages. For example, the key character string may be such data as a title name, a type number, etc.

The device determines (504) a risk level for the notification message based on the content of the notification message. In some embodiments, the risk levels include secure (or safe/benign), malicious, and unknown.

In some embodiments, the device determines the risk level for the notification message by querying a database for the notification message or the content thereof. In some embodiments, the database is located locally at the device (e.g., white list 362, FIG. 3 and black list 364, FIG. 3) or the database is located remotely (e.g., white list 114, FIG. 2 and black list 116, FIG. 2). In some embodiments, the local database and/or the remote database stores the notification messages and corresponding risk levels, which are adjustable. In some embodiments, the notification message is determined to be a secure message in the case when the notification message or the content thereof is included on the white list of the database. In some embodiments, the notification message is determined to be a malicious message when the notification message or the content thereof is included on the black list of the database. In some embodiments, the notification message is determined to be an unknown message when the notification message or the content thereof is included on neither the white list nor the black list of the database.

In some embodiments, secure notification messages included on the white list are displayed in the message box, and notification messages not in the white list are not displayed. In some embodiments, malicious notification messages in the black list are blocked, and notification messages not in the black list may be displayed. As for setting manners and updating manners for forming the white list, no limitation is made herein.

It should also be noted that the content of the database (i.e., the white list and the black list) is not exhaustive of all notification messages. Therefore, some notification messages pushed to the web browser are not included in the white list or the black list. For such unknown messages, they may be determined as notification messages that present a security risk. Since the risk level cannot be determined, the user may set or modify the risk level of the unknown messages as needed, and the web browser may display or block the unknown notification messages.

Preferably, in an alternative embodiment, the web browser chooses the remote database to perform the query so as to determine the risk level for a received notification message. In the case of a failed query, the web browser chooses the local database to perform the query. If the risk level of the notification message is saved in the local database, the type of the notification message will be synchronized to the corresponding remote database. In this way the operational burden of the device can be relieved. Of course, the web browser may also choose the local database to perform the query, and then query the remote database in the event of a failed query. In this way, the operational burden on the server can be relieved, and the query efficiency is also improved. Here, the present application is not limited to the above-mentioned manner.

In some embodiments, in the process of determining the risk level or type for the notification message, in order to improve the efficiency and accuracy of the query, the web browser queries the local database and the remote database at the same time. If the determination result of the local database and the remote database are contradictory, the web browser may default to the risk level determined in the local database and synchronize the type for the notification message saved in the local database to the remote database.

In some embodiments, because the type of a respective notification message may be modified by different users, there may be a plurality of data records in the local database and/or the remote database with respect to the respective notification message. Each data record includes the risk level of the respective notification message. As such, when querying the local database and/or the remote database, at least one data record is used to determine the type of the current message. In one example, when there are multiple data records with different risk levels for the respective notification message, the web browser identifies the query result as the risk level of the majority of the data records.

The device performs (506) an operation with the notification message according to the determined risk level for the notification message. In some embodiments, the device displays secure messages and/or unknown messages, and the device blocks/shields malicious messages.

In some embodiments, after the risk level for the notification message is determined, the device performs targeted processing on the notification message according to determined risk level. If the notification message is determined to be "secure," the notification message may be displayed normally in the web browser. If the notification message is determined to be "malicious," the notification message may be blocked by the web browser. If the risk level for the notification message cannot be determined, the notification message may be displayed in the web browser, but, in such case, the web browser may also inform the user that the notification message carries certain risks and prompt the user to classify the notification message.

In some embodiments, when the notification message is determined to be a secure message, the notification message is displayed in a message box, and security prompt information is shown in the message box. In some embodiments, the security prompt information includes one or more of: a security prompt icon, security prompt text, and a security display color of the notification message. For example, in FIG. 4C, after device determines that the notification message is a secure message, the notification message is displayed in frame 442 (i.e., the message box). Furthermore, in FIG. 4C, for example, the text indicates that the notification message is a "Benign Notification Message" and frame 442 also includes a security prompt icon in the form of a check mark (i.e., "4"). For example, in FIG. 4C, frame 442 has a green background color to indicate that the notification message is a secure message or has a benign risk level. Obviously, the kind of each of the above security prompt information as well as the form and content of each kind of security prompt information may be set according to the requirements of the web browser, and FIG. 4C has no limitation thereon.

In some embodiments, when the notification message is determined to be a malicious message, the notification message is blocked from being displayed in a message box, and security prompt information is shown in the message box. In some embodiments, the security prompt information comprises one or more of: a security prompt icon, security prompt text, and a security display color of the notification message. For example, in FIG. 4D, after the device determines the notification message is a malicious message, the notification message is blocked from being displayed in frame 450. Furthermore, in FIG. 4D, for example, the text indicates that the notification message is a "Malicious Notification Message" and frame 450 includes a security prompt icon in the form of an ex (i.e., "X"). For example, in FIG. 4D, frame 450 has a red background color to indicate that the notification message has a malicious risk level. For example, in FIG. 4D, after the notification message is determined to be a malicious message, and the content thereof is blocked, the message box shown in FIG. 4D (i.e., frame 450) is a control bar that displays the security prompt information. For example, it the control bar may also display that "the window will be closed automatically ten seconds later." Obviously, the kind of each of the above security prompt information as well as the form and content of each kind of security prompt information may be set according to the requirements of the web browser, and the FIG. 4D has no limitation thereon.

In some embodiments, after the secure message and/or the unknown message are/is displayed, and the illegal message is blocked according to the determined risk level/type of notification message, if the risk level of the notification message does not match the user's expectation, the user can preview the notification message through the preview interface provided by the web browser and modify the risk level of the notification message. For example, in FIG. 4D, if the user wishes to change the risk level of the notification message that was determined to be a malicious message, the user may select "Change Risk Level" affordance 458 to change the notification message's risk level from malicious to unknown or benign.

In some embodiments, when the notification message is determined to be an unknown message, the notification message is displayed or blocked from display in a message box, and security prompt information is shown in the message box. In some embodiments, the security prompt information comprises one or more of: a security prompt icon, security prompt text, and a security display color of the notification message. In some embodiments, the unknown message is a notification message whose type cannot be determined via a query to the local database and/or the remote database. For example, in FIG. 4F, after the device determines the notification message is an unknown message, the notification message is displayed in frame 462. Furthermore, in FIG. 4F, for example, the text indicates that the notification message is an "Unknown Notification Message" and frame 462 includes a security prompt icon in the form of a question mark (i.e., "?"). For example, in FIG. 4F, frame 462 has a yellow background color to indicate that the notification message has an unknown risk level. Obviously, the kind of each of the above security prompt information as well as the form and content of each kind of security prompt information may be set according to the requirements of the web browser, and FIG. 4F has no limitation thereon.

For example, in FIG. 4F, after the notification message is determined to be an unknown message, the user of the device may mark the notification message as "spam" by selecting "Change Risk Level" affordance 468 and thereby changing the notification message's risk level from unknown to malicious. In some embodiments, for example, after selecting "Change Risk Level" affordance 468 and changing the risk level to malicious frame 462 may be collapsed and converted into a control bar (e.g., similar to frame 450 in FIG. 4D). Continuing with this example, at this time the background color of the control bar is red. When the user wants to know the detailed content of the notification message, the user may click the control bar or an affordance thereon (e.g., a "Preview" affordance) to expand the control bar and display the notification message.

For example, method 500 may be applied to a scenario where the user of client device browses a web page using a web browser. In operation 502, the notification message embedded in the web page may be read through the web browser and displayed in the lower right corner of the web browser in a pop-up manner. In general, the notification messages typically are texts, pictures, address link information, and the like. Moreover, the notification messages are displayed in the message box at a predetermined position of the web browser. Thus, in operation 504, the web browser may extract the content of the notification message to perform a query so as to determine a risk level for the notification message. At this time, risk levels may include secure messages (saved in a white list), malicious messages (saved in a black list), and unknown messages (neither saved in the white list nor the black list). After determining the risk level for the notification message, in operation 506, the web browser displays or blocks the notification message according to the determined risk level. Of course, the above are merely some examples and the application is not limited in those examples.

From the foregoing, according to method 500, notification messages (e.g., pop-up messages) are filtered and classified. That is, an intelligent information filtering wall is established, such that only secure messages and/or unknown messages are displayed, and malicious messages, such as spam, deceptive information, viruses, and the like, are blocked. Thus, the technical problem of indiscriminate shielding performed on the notification messages in the related prior art is solved. The web browser may display the notification messages according to their determined risk levels. As such, the probability of a user clicking spam, deceptive information, or viruses is greatly reduced. Furthermore, the technical problem of blocking malicious messages while displaying secure messages by the client is achieved.

It should be understood that the particular order in which the operations in FIG. 5 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 600) are also applicable in an analogous manner to method 500 described above with respect to FIG. 5.

Figure 6A:
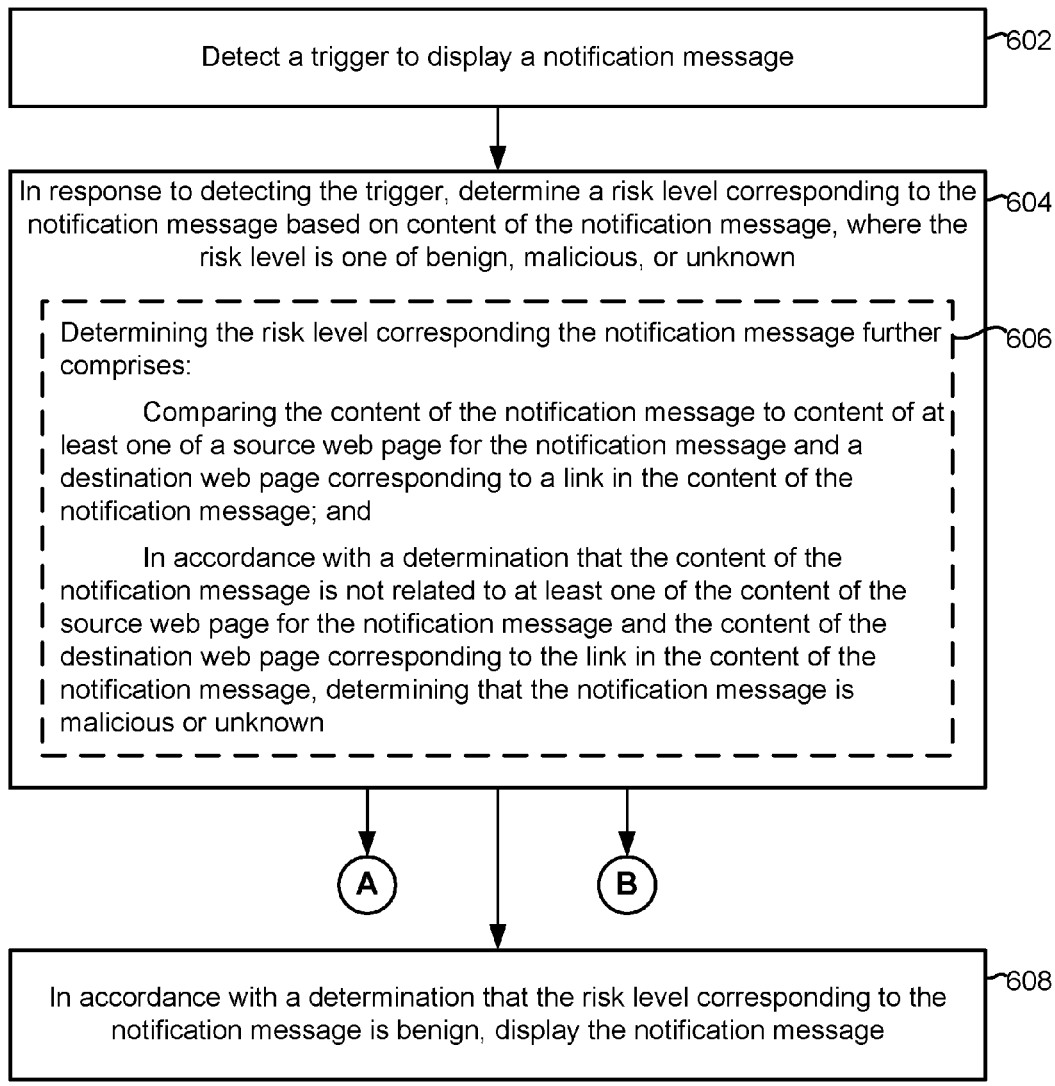
FIGS. 6A-6C illustrate a flowchart diagram of a method of secure notification message presentation in accordance with some embodiments.
Figure 6B:
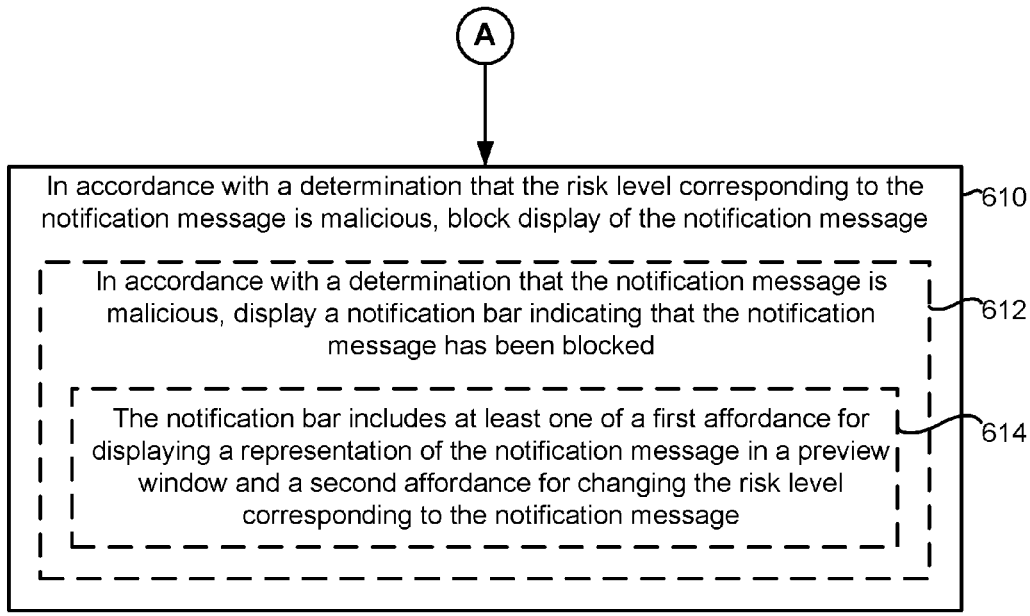
Figure 6C:
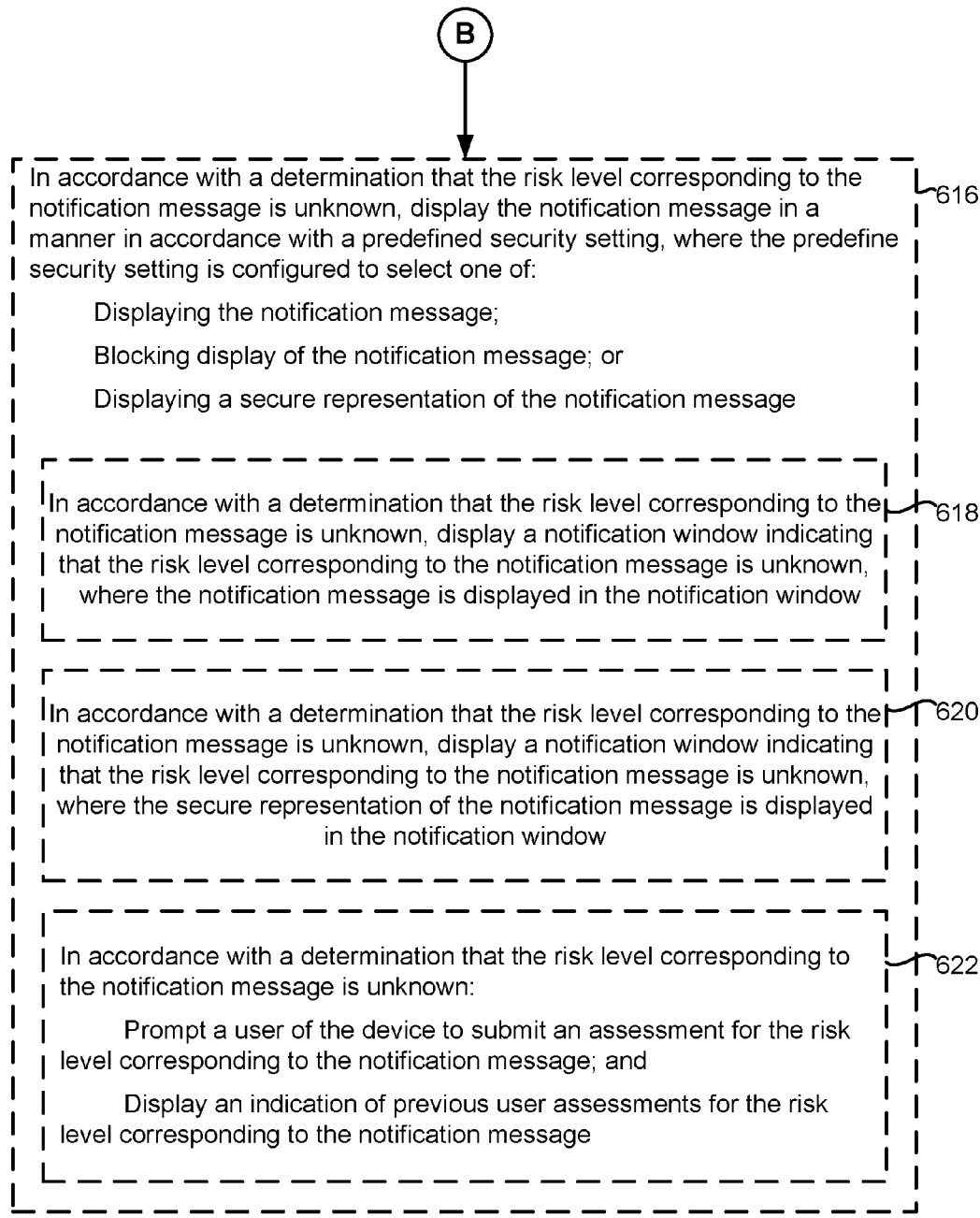

FIGS. 6A-6C illustrates a flowchart diagram of a method 600 of secure notification message presentation in accordance with some embodiments. In some embodiments, method 600 is performed by a device with one or more processors. For example, in some embodiments, method 600 is performed by client device 102 (FIGS. 1 and 3) or a component thereof (e.g., plug-in 106, FIGS. 1 and 3). In some embodiments, method 600 is governed by instructions that are stored in a non-transitory computer readable storage medium of the device and the instructions are executed by one or more processors of the device.

The device detects (602) a trigger to display a notification message. In some embodiments, client device 102 or a component thereof (e.g., trigger detection module 330, FIG. 3) detects a trigger to display a notification message in a web browser (e.g., web browser module 104, FIGS. 1 and 3). For example, while or after loading a web page, if a web browser (e.g., web browser module 104, FIGS. 1 and 3) or a secure notification message presentation application/plug-in (e.g., plug-in 106, FIGS. 1 and 3) identifies code or a script in the web page that causes a notification message (e.g., a pop-up message) to appear, the trigger is detected. For example, before, after, or while rendering the landing page for the website displayed in FIG. 4A, plug-in 106 (FIGS. 1 and 3) detects a trigger to display a notification message in the web browser. For example, plug-in 106 identifies code or a script for embedded in the source code for the landing page for the website for triggering display of update notification 436 displayed in FIG. 4B.

In response to detecting the trigger, the device determines (604) a risk level corresponding to the notification message based on content of the notification message, where the risk level is one of benign, malicious, or unknown. In some embodiments, client device 102 or a component thereof (e.g., risk level determination module 332, FIG. 3) determines a risk level corresponding to the notification message based on content of the notification message. For example, the content indicates that the notification message or the content itself is on a white list (i.e., benign), black list (i.e., malicious), or neither the white list nor the black list (i.e., unknown). In some embodiments, the content of the notification message includes the title bar, body content, and destination link of the notification message. For example, after detecting the trigger and instead of automatically displaying update notification 436 as in FIG. 4B, plug-in 106 determines a risk level corresponding update notification 436 based on the content of update notification 436.

In some embodiments, the device determines (606) the risk level corresponding to the notification message by: comparing the content of the notification message to content of at least one of a source web page for the notification message and a destination web page corresponding to a link in the content of the notification message; and, in accordance with a determination that the content of the notification message is not related to at least one of the content of the source web page for the notification message and the content of the destination web page corresponding to the link in the content of the notification message, determining that the notification message is malicious or unknown. In some embodiments, client device 102 or a component thereof (e.g., content comparison module 334, FIG. 3) compares the content of the notification message to content of at least one of a source web page for the notification message and a destination web page corresponding to a link in the content of the notification message. In some embodiments, if the content of the notification message is not related to the URL and/or content of the source and/or the URL and/or content of the destination pages, the notification message is determined to be unknown or malicious based on predefined security settings. In some embodiments, the notification message is also labeled as suspicious and placed on a list of suspicious notification messages (e.g., unknown messages database 366, FIG. 3). The risk level determination process based on the white list and the black list in operation 604 is different from the risk level determination process in operation 606. In some embodiments, the determination of whether content of two objects (e.g., notification and webpage) are related is based on whether the topics extracted from the content of the two objects fall into the same topic category. In some embodiments, the determination of whether content of two objects (e.g., URL of the notification and URL of the source or destination pages) are related is based on whether the addresses of the two objects have matching domain names. In some embodiments, the determination of whether content of a webpage (e.g., the content of the source or destination webpage) is related to an address (e.g., address of the notification message) is based on whether they appear to associated with the same entity (e.g., company).

In accordance with a determination that the risk level corresponding to the notification message is benign, the device displays (608) the notification message. For example, the notification message is a banner message or a pop-up message displayed over the web page in a new window. In some embodiments, client device 102 or a component thereof (e.g., displaying module 338, FIG. 3) displays the notification message in accordance with a determination that notification message is included on a white list (e.g., white list 114, FIG. 2 or white list 362, FIG. 3). In FIG. 4C, for example, the web browser displays update notification 436 within frame 442, which is associated with plug-in 106, in accordance with a determination that update notification 436 is included on a white list.

In accordance with a determination that the risk level corresponding to the notification message is malicious, the device blocks (610) display of the notification message. In some embodiments, client device 102 or a component thereof (e.g., blocking module 340, FIG. 3) blocks display of the notification message in accordance with a determination that notification message is included on a black list (e.g., black list 116, FIG. 2 or black list 364, FIG. 3). In FIG. 4D, for example, the web browser displays frame 450, which is associated with plug-in 106, blocking update notification 436 in accordance with a determination that update notification 436 is included on a black list.

In some embodiments, in accordance with a determination that the notification message is malicious, the device displays (612) a notification bar indicating that the notification message has been blocked. In some embodiments, the notification bar is displayed over the web page in a new window or as an extension of the web browser's toolbar. In some embodiments, the notification bar is displayed for X seconds at which point the web browser ceases to display the notification bar. In FIG. 4D, for example, frame 450 is a notification bar (sometimes also called a "control bar") that is an extension of the toolbar for the web browser. For example, in FIG. 4D, frame 450 indicates that plug-in 106 has determined that update notification 436 is associated with a malicious risk level (e.g., update notification 436 is on black list 116, FIG. 2 or black list 364, FIG. 3). In some embodiments, the notification bar also indicates a number of users who have marked the notification message as spam.

In some embodiments, the notification bar includes (614) at least one of a first affordance for displaying a representation of the notification message in a preview window and a second affordance for changing the risk level corresponding to the notification message. For example, in FIG. 4D, frame 450 includes "Preview" affordance 456, which, when activated (e.g., with a tap gesture), causes the web browser to display a representation of update notification 436 within frame 450. For example, in FIG. 4D, frame 450 also includes "Change Risk Level" affordance 458, which, when activated (e.g., with a tap gesture), enables the user of client device 102 to change the risk level for update notification 436 from malicious to unknown or benign.

In some embodiments, the representation displayed in the preview window is a static image. In some embodiments, the preview window is associated with a virtual machine and the user is able to execute the notification message or select its corresponding affordances. As such, the user is able to view and test the notification message in a virtual/sandbox environment without risk of compromising the device. In some embodiments, client device 102 or a component thereof (e.g., secure environment module 342, FIG. 3) displays a secure representation of the notification message (e.g., a static image or the notification message within the virtual machine). For example, in FIG. 4E, the web browser displays update notification 436 within frame 450 associated with plug-in 106 in response to selection of "Preview" affordance 456 in FIG. 4D. For example, with respect to FIG. 4E, update notification 436 is static image within frame 450. Thus, in this example, the user of client device 102 is not able to select "Repair Immediately" affordance 438 and "Cancel" affordance 440. In another example, with respect to FIG. 4E, update notification 436 is displayed within a secure virtual machine separate from client device 102. Thus, in this example, the user of client device 102 is able to select "Repair Immediately" affordance 438 and "Cancel" affordance 440 but is not able to install Yueduan.exe on client device 102.

In some embodiments, in accordance with a determination that the risk level corresponding to the notification message is unknown, the device displays (616) the notification message in a manner in accordance with a predefined security setting, where the predefined security setting is configured to select one of: displaying the notification message; blocking display of the notification message; or displaying a secure representation of the notification message. In some embodiments, in accordance with a determination that the notification message is neither included on the white list nor the black list and in a manner in accordance with a predefined security setting, client device 102 or a component thereof (e.g., performance module 336, FIG. 3): (a) displays the notification message; (b) blocks display of the notification message; or (c) displays a secure representation of the notification message In some embodiments, the predefined security setting is a default or user defined action to take for unknown notification messages (i.e., messages on neither the black list nor the white list). In some embodiments, the secure representation is a static image of the notification message where actions or buttons associated with the notification message cannot be activated. As such, the user is shielded from potential harmful effects of the notification message such as executing or downloading malicious code.

In some embodiments, in accordance with a determination that the risk level corresponding to the notification message is unknown, the device displays (618) a notification window indicating that the risk level corresponding to the notification message is unknown, where the notification message is displayed in the notification window. In FIG. 4F, for example, the web browser displays update notification 436 within frame 462, which is associated with plug-in 106, in accordance with a determination that update notification 436 is neither included on the white list nor the black list and the predefined security setting indicates to displays the notification message. For example, in FIG. 4F, frame 462 indicates that plug-in 106 has determined that update notification 436 is associated with an unknown risk level. For example, in FIG. 4F, update notification 436 is live within frame 462. Thus, the user of client device 102 is able to select "Repair Immediately" affordance 438 and "Cancel" affordance 440.

In some embodiments, in accordance with a determination that the risk level corresponding to the notification message is unknown, the device displays (620) a notification window indicating that the risk level corresponding to the notification message is unknown, where the secure representation of the notification message is displayed in the notification window. In FIG. 4F, for example, the web browser displays a secure representation of update notification 436 within frame 462, which is associated with plug-in 106, in accordance with a determination that update notification 436 is neither included on the white list nor the black list and the predefined security setting indicates to displays the notification message. For example, in FIG. 4F, update notification 436 is a static image within frame 462. Thus, in this example, the user of client device 102 is not able to select "Repair Immediately" affordance 438 and "Cancel" affordance 440.

In some embodiments, in accordance with a determination that the risk level corresponding to the notification message is unknown, the device (622): prompts a user of the device to submit an assessment for the risk level corresponding to the notification message; and displays an indication of previous user assessments for the risk level corresponding to the notification message. For example, the user is prompted to vote as to whether the notification message is safe or unsafe. For example, the indication shows a number of safe votes and/or a number of unsafe for the notification message. In some embodiments, all of the notification windows show a number of safe votes and/or a number of unsafe for the notification message, including the ones determined to be secure and malicious (e.g., in FIGS. 4C and 4D). In some embodiments, once the ratio of safe to unsafe votes reaches a predetermined threshold, the notification message is determined to be benign. In some embodiments, once the ratio of unsafe to safe votes reaches a predetermined threshold, the notification message is determined to be malicious.

For example, in FIG. 4F, frame 462 includes text box 466 indicating a count of times that users have marked update notification 436 as safe and a count of times that users have marked update notification 436 as unsafe. In FIG. 4F, frame 462 also includes "Change Risk Level" affordance 468, which, when activated (e.g., with a tap gesture), enables the user of client device 102 to change the risk level for update notification 436 from unknown to benign or malicious. FIG. 4F also illustrates client device detecting contact 472 at a location corresponding to "Change Risk Level" affordance 468. For example, in response to selection of "Change Risk Level" affordance 468, the web browser displays a series of affordances, a slider, and/or another user interface component for submitting an assessment for the risk level of update notification 436: benign or malicious.

It should be understood that the particular order in which the operations in FIGS. 6A-6C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 500) are also applicable in an analogous manner to method 600 described above with respect to FIGS. 6A-6C.

Figure 7:
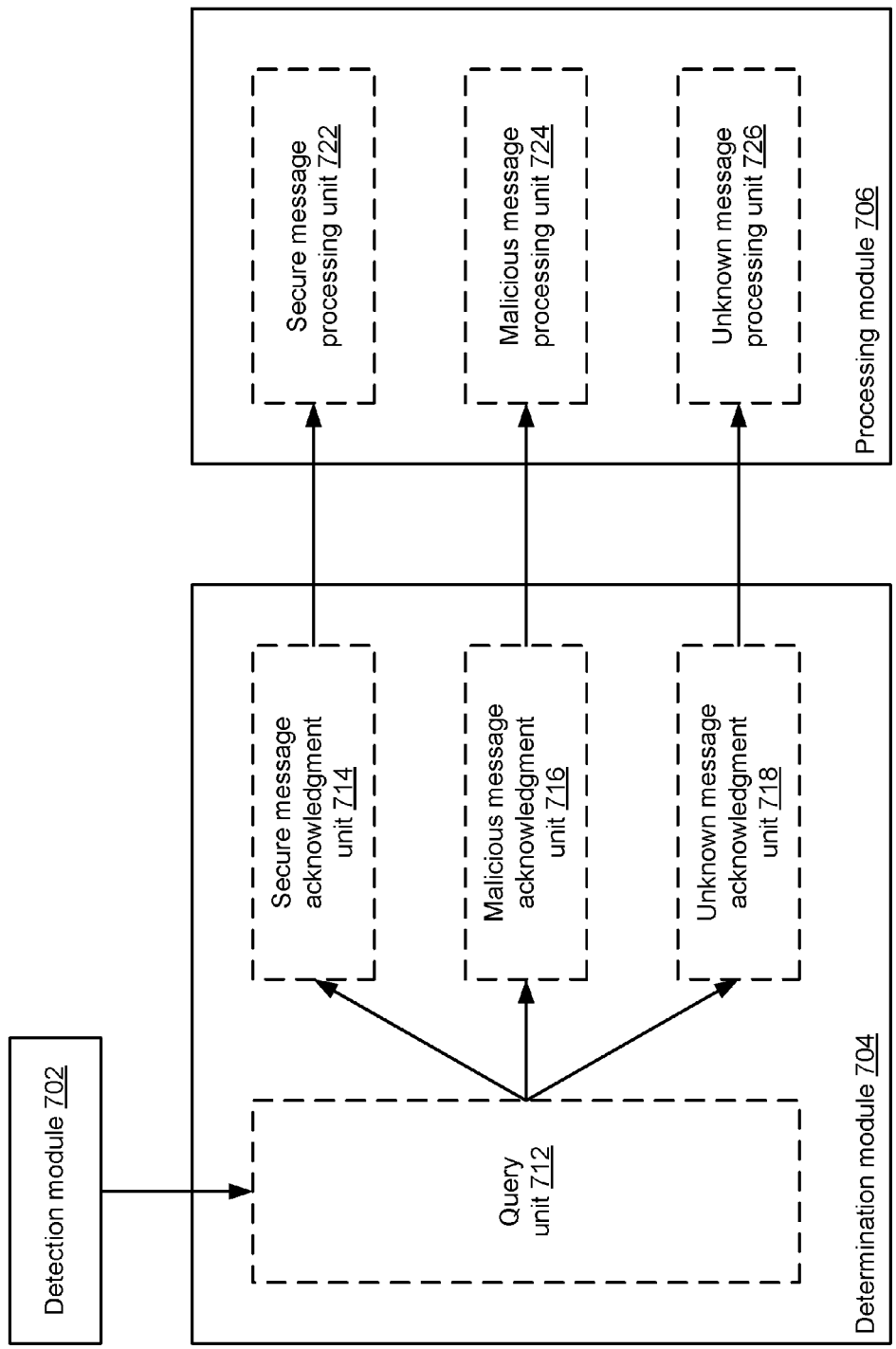
FIG. 7 is a block diagram of an apparatus for processing notification messages in accordance with some embodiments.

FIG. 7 is a block diagram of an apparatus for processing notification messages in accordance with some embodiments. In some embodiments, the apparatus implements method 500 in FIG. 5. For example, the apparatus corresponds to plug-in 106 (FIGS. 1 and 3). In some embodiments, the apparatus may be implemented in whole or in part on a device (e.g., client device 102, FIGS. 1 and 3) through software, hardware, or a combination thereof. In some embodiments, the apparatus includes a detection module 702, a determination module 704, and a processing module 706.

In some embodiments, detection module 702 is configured to detect a trigger to display a notification message.

In some embodiments, determination module 704 is configured to determine a risk level for the notification message based on the content of the notification message.

In some embodiments, processing module 706 is configured to perform an operation with the notification message according to the determined risk level for the notification message.

In some embodiments, determination module 704 further includes: a query unit 712, a secure message acknowledgment unit 714, a malicious message acknowledgment unit 716, and an unknown message acknowledgment unit 718.

In some embodiments, query unit 712 is configured to query a database to determine the risk level for the notification message based on the notification message or the content thereof. In some embodiments, the database is located locally at the device (e.g., white list 362, FIG. 3 and black list 364, FIG. 3) or the database is located remotely (e.g., white list 114, FIG. 2 and black list 116, FIG. 2).

In some embodiments, secure message acknowledgment unit 714 is configured to determine that the notification message is a secure message when the notification message or the content thereof is included on the white list of the database.

In some embodiments, malicious message acknowledgment unit 716 is configured to determine that the notification message is a malicious message when the notification message or the content thereof is included on the black list of the database.

In some embodiments, unknown message acknowledgment unit 718 is configured to determine that the notification message is an unknown message when the notification message or the content thereof is included on neither the white list nor the black list of the database.

In some embodiments, processing module 706 further includes: a secure message processing unit 722, a malicious message processing unit 724, and an unknown message processing unit 726.

In some embodiments, secure message processing unit 722 is configured to display the notification message in accordance with a determination that the notification message is determined to be "secure" or associated with a benign risk level. For further discussion see FIG. 4C and accompanying text.

In some embodiments, malicious message processing unit 724 is configured to block display the notification message in accordance with a determination that the notification message is determined to be associated with a malicious risk level. For further discussion see FIG. 4D and accompanying text.

In some embodiments, unknown message processing unit 726 is configured to display the notification message in accordance with a determination that the notification message is determined to be associated with an unknown risk level. In some embodiments, unknown message processing unit 726 is also configured to inform the user that the notification message carries certain risks and prompt the user to classify the notification message. For further discussion see FIG. 4F and accompanying text.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of secure notification message presentation, the method comprising:
   at a device with one or more processors and memory:
      detecting a trigger to display a notification message after loading a web page into a web browser;
      in response to detecting the trigger, determining a risk level corresponding to the notification message based on content of the notification message, wherein the risk level is one of benign, malicious, or unknown, and wherein determining the risk level further comprises:
         comparing the content of the notification message to content of at least one of a source web page for the notification message and a destination web page corresponding to a link in the content of the notification message; and
         in accordance with a determination that the content of the notification message is not related to at least one of the content of the source web page for the notification message and the content of the destination web page corresponding to the link in the content of the notification message, determining that the notification message is malicious or unknown;
      in accordance with a determination that the risk level corresponding to the notification message is benign, displaying the notification message on top of the web page; and in accordance with a determination that the risk level corresponding to the notification message is malicious:
blocking display of the notification message;
generating a secure representation of the notification message; and
displaying the secure representation of the notification message on top of the web page.

2. The method of claim 1, further comprising:
in accordance with a determination that the risk level corresponding to the notification message is unknown, displaying the notification message in a manner in accordance with a predefined security setting, wherein the predefined security setting is configured to select one of:
displaying the notification message;
blocking display of the notification message; or
displaying a secure representation of the notification message.

3. The method of claim 2, further comprising:
in accordance with a determination that the risk level corresponding to the notification message is unknown, displaying a notification window indicating that the risk level corresponding to the notification message is unknown, wherein the secure representation of the notification message is displayed in the notification window.

4. The method of claim 1, further comprising:
in accordance with a determination that the risk level corresponding to the notification message is unknown:
prompting a user of the device to submit an assessment for the risk level corresponding to the notification message; and
displaying an indication of previous user assessments for the risk level corresponding to the notification message.

5. The method of claim 1, further comprising:
in accordance with a determination that the notification message is malicious, displaying a notification bar indicating that the notification message has been blocked.

6. The method of claim 5, wherein the notification bar includes at least one of a first affordance for displaying a representation of the notification message in a preview window and a second affordance for changing the risk level corresponding to the notification message.

7. A device, comprising:
one or more processors; and
memory storing one or more programs to be executed by the one or more processors, the one or more programs comprising instructions for:
detecting a trigger to display a notification message after loading a web page into a web browser;
in response to detecting the trigger, determining a risk level corresponding to the notification message based on content of the notification message, wherein the risk level is one of benign, malicious, or unknown, and wherein the instructions for determining the risk level further comprises:
comparing the content of the notification message to content of at least one of a source web page for the notification message and a destination web page corresponding to a link in the content of the notification message; and
in accordance with a determination that the content of the notification message is not related to at least one of the content of the source web page for the notification message and the content of the destination web page corresponding to the link in the content of the notification message, determining that the notification message is malicious or unknown;
in accordance with a determination that the risk level corresponding to the notification message is benign, displaying the notification message on top of the web page; and
in accordance with a determination that the risk level corresponding to the notification message is malicious:
blocking display of the notification message;
generating a secure representation of the notification message; and
displaying the secure representation of the notification message on top of the web page.

8. The device of claim 7, wherein the one or more programs further comprise instructions for:
in accordance with a determination that the risk level corresponding to the notification message is unknown, displaying the notification message in a manner in accordance with a predefined security setting, wherein the predefined security setting is configured to select one of:
displaying the notification message;
blocking display of the notification message; or
displaying a secure representation of the notification message.

9. The device of claim 8, wherein the one or more programs further comprise instructions for:
in accordance with a determination that the risk level corresponding to the notification message is unknown, displaying a notification window indicating that the risk level corresponding to the notification message is unknown, wherein the secure representation of the notification message is displayed in the notification window.

10. The device of claim 7, wherein the one or more programs further comprise instructions for:
in accordance with a determination that the risk level corresponding to the notification message is unknown:
prompting a user of the device to submit an assessment for the risk level corresponding to the notification message; and
displaying an indication of previous user assessments for the risk level corresponding to the notification message.

11. The device of claim 7, wherein the one or more programs further comprise instructions for:
in accordance with a determination that the notification message is malicious, displaying a notification bar indicating that the notification message has been blocked.

12. The device of claim 11, wherein the notification bar includes at least one of a first affordance for displaying a representation of the notification message in a preview window and a second affordance for changing the risk level corresponding to the notification message.

13. A non-transitory computer readable storage medium storing one or more programs, the one or more programs comprising instructions, which, when executed by a device with one or more processors, cause the device to perform operations comprising:
detecting a trigger to display a notification message after loading a web page into a web browser;

in response to detecting the trigger, determining a risk level corresponding to the notification message based on content of the notification message, wherein the risk level is one of benign, malicious, or unknown, and wherein determining the risk level further comprises:
    comparing the content of the notification message to content of at least one of a source web page for the notification message and a destination web page corresponding to a link in the content of the notification message; and
    in accordance with a determination that the content of the notification message is not related to at least one of the content of the source web page for the notification message and the content of the destination web page corresponding to the link in the content of the notification message, determining that the notification message is malicious or unknown;
in accordance with a determination that the risk level corresponding to the notification message is benign, displaying the notification message on top of the web page; and
in accordance with a determination that the risk level corresponding to the notification message is malicious:
    blocking display of the notification message;
    generating a secure representation of the notification message; and
    displaying the secure representation of the notification message on top of the web page.

14. The non-transitory computer readable storage medium of claim 13, wherein the instructions cause the device to perform operations further comprising:
in accordance with a determination that the risk level corresponding to the notification message is unknown, displaying the notification message in a manner in accordance with a predefined security setting, wherein the predefined security setting is configured to select one of:
    displaying the notification message;
    blocking display of the notification message; or
    displaying a secure representation of the notification message.

15. The non-transitory computer readable storage medium of claim 14, wherein the instructions cause the device to perform operations further comprising:
in accordance with a determination that the risk level corresponding to the notification message is unknown, displaying a notification window indicating that the risk level corresponding to the notification message is unknown, wherein the secure representation of the notification message is displayed in the notification window.

16. The non-transitory computer readable storage medium of claim 13, wherein the instructions cause the device to perform operations further comprising:
in accordance with a determination that the risk level corresponding to the notification message is unknown:
    prompting a user of the device to submit an assessment for the risk level corresponding to the notification message; and
    displaying an indication of previous user assessments for the risk level corresponding to the notification message.

17. The non-transitory computer readable storage medium of claim 13, wherein the instructions cause the device to perform operations further comprising:
in accordance with a determination that the notification message is malicious, displaying a notification bar indicating that the notification message has been blocked.

* * * * *